(12) United States Patent
Kondo et al.

(10) Patent No.: US 6,499,189 B2
(45) Date of Patent: *Dec. 31, 2002

(54) HINGE APPARATUS AND IMAGE FORMING DEVICE HAVING A PLATEN COVER CONTROL APPARATUS

(75) Inventors: Jun Kondo, Yamanashi-Ken (JP); Mitsumasa Ogihara, Yamanashi-Ken (JP)

(73) Assignee: Nisca Corporation, Yamanashi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 13 days.

(21) Appl. No.: 09/238,025

(22) Filed: Jan. 25, 1999

(65) Prior Publication Data

US 2002/0166208 A1 Nov. 14, 2002

(51) Int. Cl.[7] ................ E05F 1/08; E05D 7/06
(52) U.S. Cl. ................ 16/289; 16/288; 16/370; 16/239; 16/286
(58) Field of Search ................ 16/289, 290, 286–288, 16/366, 370, 335, 239, 242

(56) References Cited

U.S. PATENT DOCUMENTS

| | | | | | |
|---|---|---|---|---|---|
| 1,496,965 A | * | 6/1924 | Aldeen | ......... | 16/288 |
| 2,091,673 A | * | 8/1937 | Orlow | ......... | 16/358 |
| 2,520,921 A | * | 9/1950 | Foster | ......... | 16/288 |
| 2,956,303 A | * | 10/1960 | Fiedler | ......... | 16/288 |
| 3,054,137 A | * | 9/1962 | Pulleryblank | ......... | 16/370 |
| 3,815,176 A | * | 6/1974 | Porter | ......... | 16/288 |
| 4,827,569 A | * | 5/1989 | Mertes | ......... | 16/288 |
| 4,838,111 A | * | 6/1989 | Schmidt | ......... | 16/337 |
| 5,541,712 A | * | 7/1996 | Fujitaka et al. | ......... | 355/231 |
| 5,664,290 A | * | 9/1997 | Scherrer | ......... | 16/370 |
| 5,897,113 A | * | 4/1999 | Kondo et al. | ......... | 271/213 |

FOREIGN PATENT DOCUMENTS

| | | |
|---|---|---|
| JP | Sho58-102932 A | 6/1983 |
| JP | Sho 60-26331 A | 2/1985 |
| JP | Sho 60-263935 A | 12/1985 |
| JP | Sho 61-20587 Y2 | 6/1986 |
| JP | Hei 2-67332 U | 5/1990 |
| JP | Hei6-70110 A | 3/1994 |
| JP | Hei6-194748 A | 7/1994 |
| JP | Hei6-194749 A | 7/1994 |
| JP | Hei7-54536 A | 2/1995 |

* cited by examiner

Primary Examiner—Chuck Y. Mah
(74) Attorney, Agent, or Firm—James Creighton Wray; Meera P. Narasimhan

(57) ABSTRACT

A hinge apparatus employs a base, a second base, link arms, urging means and the characteristics of a parallelogram formed by the shape of said base, second base and paired link members to enable a body such as a platen cover to rotate up open and lower substantially parallel to an original platen and to enable the parallel opening of the body thereby ensuring the complete covering of a thick original or a book original placed upon the clear glass platen enabling good quality copies of the original regardless of its thickness.

9 Claims, 16 Drawing Sheets

F I G. 1 2
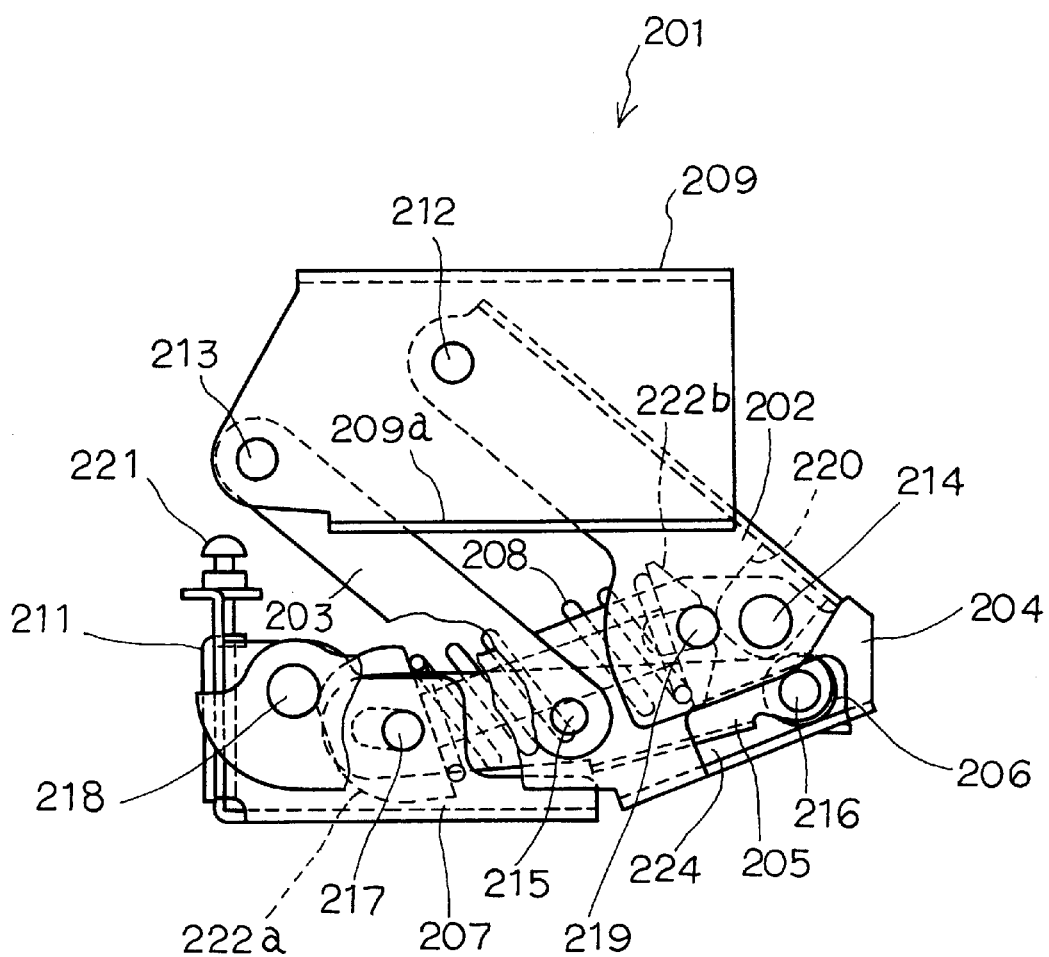

HINGE APPARATUS AND IMAGE FORMING DEVICE HAVING A PLATEN COVER CONTROL APPARATUS

BACKGROUND OF THE INVENTION

1. Field of the Invention

This invention relates to a pivotably opening and closing hinge apparatus that connects two devices and particularly to a hinge apparatus that supports an opening and closing automatic document feeder equipped over the original platen or the cover placed on the original platen established on the upper surface of a photographic copying machine; a facsimile apparatus or an image scanner (called image forming apparatus below).

2. Description of the Related Arts

Image forming apparatuses have a clear glass platen plate (called platen below) that comprises the original platen through which light is radiated from below to reflect off of an original document so that the reflected image can be obtained to form an image of the original placed on that platen. It is not unusual for an operator to place one sheet of an original or to place a thick book on the platen for photocopied reproduction. In either case, it is essential to the clarity and the quality of the reproduction of the original to prevent the excessive diffusion of light outside of the image forming apparatus by using a covering body or a cover to push and press the original securely against the platen.

Ordinarily, platen covers are attached to the upper part of the image forming apparatus using a hinge. Ordinary hinge mechanisms have a first attachment plate that is firmly attached to the image forming apparatus and a second attachment plate that is firmly attached to the platen cover that pivot around a common rotating axis. In this construction, the platen cover pivots around this axis to allow the platen cover to open and close with respect to the top of the platen.

It is not uncommon that the platen cover also has functions that are often associated with an automatic document feeder wherein such an apparatus is mounted onto the image forming apparatus to enable the consecutive feeding of a plurality of unbound and loose sheets one sheet at a time to the platen of the image forming apparatus. In such a case, the automatic document feeder itself also performs the essential function of the platen cover.

It should be understood that when an operator wants to use an image forming apparatus to copy specific pages from a relatively thick medium such as a book, the ordinary hinge mechanism just described, namely of a cover or an automatic document feeder mounted onto an image forming apparatus, can only apply a pushing pressure to one edge of the thick original, or book, to hold it in place against the platen of the image forming apparatus which will damage the binding of a book. Of course, if the operator should apply too much pressure from above onto the cover or the automatic document feeder to more completely cover the medium and thereby attempt to prevent unwanted diffusion of light, there would be an unequal distribution of pressure on the platen which will result in the damaging or even the cracking of the platen.

Thus, in order to alleviate such unwanted situations that result from the two piece construction of an automatic document feeder mounted to an image forming apparatus, it is desirable to arrange the structure of one device (hereinafter called "platen cover") with respect to the other device so that it can apply an equal pressure over the entire back side of a thick book by being parallel with respect to platen.

There have been opening and closing hinge apparatuses that move the platen cover into a vertical and parallel position above the platen.

An example of the prior art is disclosed in Japanese Patent Application Disclosure No. Hei 5-9597. The hinge apparatus (hereinafter called "first art") described is shown in FIGS. 15A to 15D. The first art shown in FIG. 15A comprises the attachment frame 302 which is attached to the copy machine 301 and the movable hinge 304 which is attached to the platen cover 303. The rising and lowering hinge 306 pivotably supports the movable hinge 304 on the shaft 305 and the parallel link arms 307 and 308 are connected to allow the rising and lower hinge 306 to move vertically with respect to the attachment frame 302. One end of each of the parallel link arms 307 and 308 is attached to the attachment frame 302 by shafts 309 and 310 respectively, and the other ends of each of the parallel link arms 307 and 308 are attached to the rising and lowering hinge 306 by the shafts 311 and 312, respectively. As can be seen in FIGS. 15(A) through (D), when the platen cover is opened by operating the platen cover hinge 303 to copy a thick document 313, the inner side of the platen cover pushes on the outer edge of the thick document 313 as the operator opens the platen cover by lifting. This pivots the platen cover on and around the line of the point of contact by pushing on the edge of the thick document 313. In the system as described for the hinge mechanism related to the first art, the rising and lowering hinge 306 is attached to the frame 302 using the parallel links 307 and 308 so the vertical movements of the parallel links 307 and 308 have substantially the same circular action. Thus, it is possible to attain the smooth upward movement of the rising and lowering hinge 306 only if the rotational force of the platen cover 303 is transmitted to the rising and lower hinge 306 using the thick document 313.

This hinge structure unifies the lifter mechanism by connecting the rising and lowering hinge 306 to the attachment frame 302 with the parallel links 307 and 308 thereby making it possible to provide a single hinge apparatus which encompasses both the opening and closing functions and the lifter function.

Another hinge apparatus (called "second art" below) is disclosed in Japanese Patent Application No. Hei 61-20587 disclosed in the prior art as a document holder capable of opening and closing. This hinge apparatus, as can be seen in FIG. 16, comprises the lifter 351 which is attached to the copy machine 350 and the hinge 352 which is attached to the lifter 351. The platen cover 353 can be opened and closed with the hinge 352. The lifter 351 is composed of the base plate 354 and the paired first rising and lowering arms 355 and 356 which are attached to base plate 354 so that the platen cover 353 is vertically movable in the direction of opening and closing. The paired second rising and lowering arms 357 and 358 are movably attached to the free end of both the paired first rising and lowering arms 355 and 356 and the bracket 359 is attached to the free ends of the paired second rising and lowering arms 357 and 358. This bracket 359 employs the attached structure of the hinge 352. It is possible with this particular structure for an operator to place a thick book onto the platen without the front end of the platen cover remaining at an angle. This structure allows the complete and parallel covering of the upper surface of the book. It is also important to note that the structure of this apparatus prevents the platen cover from bending and it prevents the diffusion of light to outside of the photographic copy machine and the infusion of light into the internal optical system.

However, in the hinge apparatus of the first art just described, the pressing action of the platen cover 303 causes the lift mechanism to continue functioning while the edge of the book and the platen cover 303 are in contact. Thus, the thickness and the positioning of the book on the platen induce the book to move and become displaced in the left and right directions of FIG. 15C. Such a force generated by this movement presents the unwanted possibility of bending or otherwise damaging the pages that are in contact with the platen or causing the book to become mis-positioned. In this hinge apparatus, there is no systematic relationship between the movements of the hinge 306 and the lift action so when the operator is opening or closing the platen cover 360, he or she must perform the separate and unrelated actions of opening or closing the platen cover 360 and then operating the lift. These make the operation of the platen cover 360 a more complex task when the copying of a thick book is desired.

Also, in the platen cover hinge apparatus described above as the second art, there is an excessive cost because of the duplicative construction of each of the parts which are independently structured to enable the lift mechanism which uses a jack method to raise and lower the hinge for the opening and the closing actions. Also, because the operator must perform the action of opening or closing the platen cover and the action of lifting the entire platen cover, as is also the case with the first art, the operation of the platen cover is a more complex task and therefore it is more difficult.

SUMMARY OF THE INVENTION

It is an object of the present invention to provide a hinge apparatus that can perform both the rotating function along with a rising and lowering action to allow the platen cover to cover the thick book original both horizontally and parallelly without damaging the book or causing mis-positioning of the book.

It is also an object of the present invention to provide a hinge apparatus that is capable of pivoting open, and that is also capable of rising and lowering parallel to the copy machine body in one easy operation.

Another object of the present invention is to provide a hinge apparatus which is of a simple construction and which enables a platen cover to pivotally rotating open and to rise and lower parallel to the copy machine body in one easy operation.

In order to attain the objectives of the hinge apparatus, the present hinge apparatus that connects two bodies and opens and closes comprises an arm member pivotably attached to one of either of two bodies and an arm member connected to the other of the bodies. The first and second paired link members are equally spaced from each other and the bases of the arm members are pivotably attached to the apparatus body. The paired link members pivot in the same direction on their ends spaced apart in the direction of the pivot.

Also, the distances of the paired link members in the pivoting direction and the lengths of the link members substantially form a parallelogram.

There is also a means for restricting the opening and closing movement of at least one side of the pivoting movement of said arm member and the pivoting movement of said link arm member.

At the point where the platen cover is rotating from an open state to a closed state, a restricting means restricts the movement so that the first arm member will rotate, then the link member will rotate.

DETAILED DESCRIPTION OF THE DRAWINGS

FIG. 12 is a partially sectional view of the hinge apparatus 201.

DETAILED DESCRIPTION OF THE PREFERRED EMBODIMENTS

The following is a detailed explanation of the preferred embodiments of the present hinge apparatus based on the figures provided.

Figure 1A:
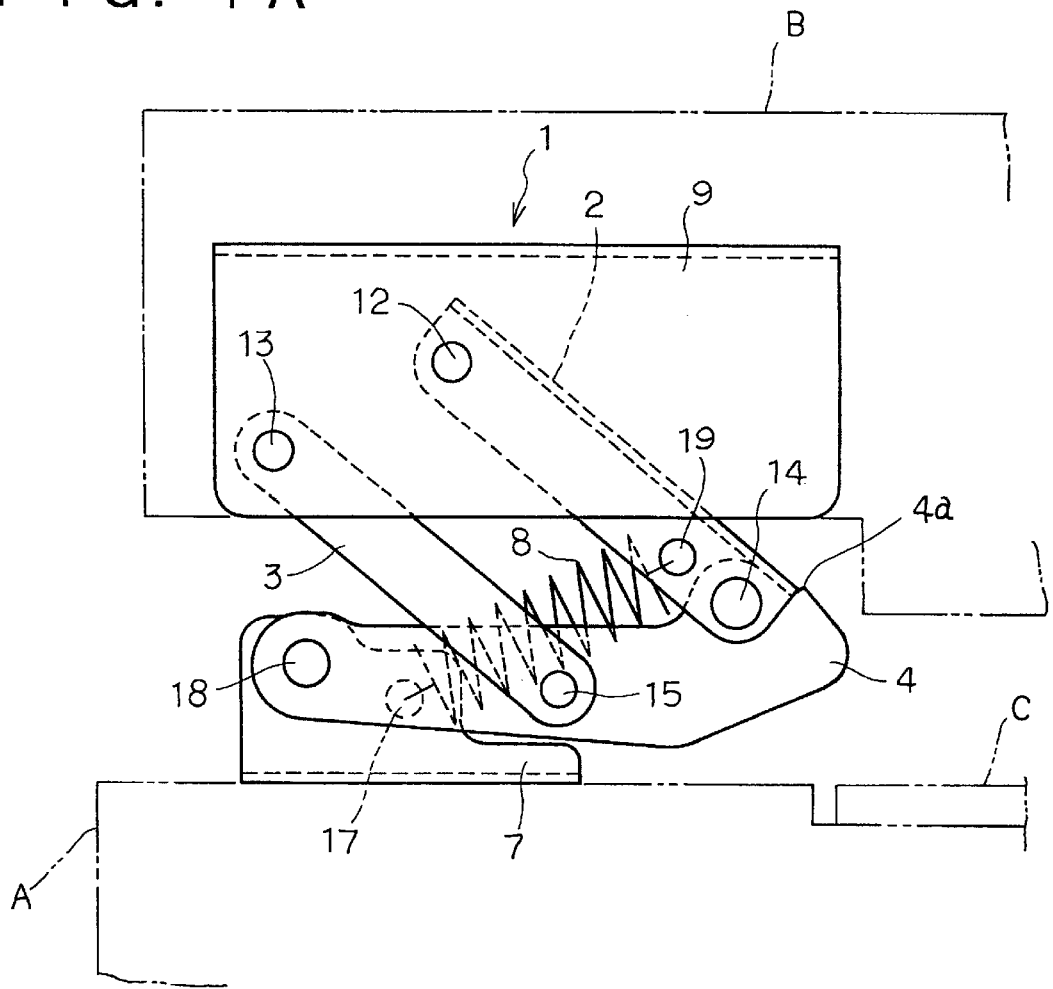
FIG. 1A is a perspective side view of the hinge apparatus of the present invention.

FIG. 1(A) is a perspective view of the hinge apparatus 1 for the opening and the closing of the platen cover B of an automatic document feeder device or the like that is attached to the upper part of an image forming device A such as a copying machine or image reading device. The dotted lines of the drawing indicate the areas that are concealed from view inside of the apparatus. The hinge apparatus 1 is permanently attached to the top of the device A and it has a base 7 that also acts as a supporting member. The upper side of the hinge apparatus 1 has the second base 9 that is the member that is permanently attached to the platen cover B (called cover B below) which is the cover for the image forming device A. The cover B is attached extending in the length direction of the second base 9. Therefore, as is explained in our detailed description of the preferred embodiments provided below, it is easy for an operator to set a document or other original onto the top of the platen glass C (called platen below) that is established on the upper surface of the image forming device A or to vertically raise and lower the platen cover directly over the thick book to apply an equalized pressure from above because of the rotating movement and the up and down movement of the second base 9.

One end of the arm 4 is pivotably supported by pin 18 so that the arm 4 can rotate around the center of the pin 18. The arm 4 is also connected to the base 7 by the pin 18. The arm 4 and second base 9 are connected by the forward link 2 and rearward link 3 that are established at a determined distance at the front and back sides with respect to the opening and closing direction. At the other end of the arm 4, forward link 2 is pivotably supported by pin 14 so that the forward link 2 can rotate around the center of the pin 14 and one end of the forward link 2 is pivotably connected to the arm 4 by the pin 14. Also, at a mid-point position of the arm 4 and established at a distance in the front and back sides of the opening and closing direction, the rearward link 3 is pivotably supported by pin 15 so that the rearward link 3 can rotate around the center of the pin 15 and rearward link 3 is connected to the arm 4 by the pin 15. In a position near the pin 18, the pin 17 is attached to the base 7 and at a position slightly separated from the pin 14, the pin 19 is attached to the forward link 2. An urging means, for example a compressed spring 8 adjoins the two pins of 17 and 19. At the upper end of the forward link 2, the second base 9 is pivotably supported by the pin 12 so that both the second base 9 and the forward link 2 can rotate relative to each other around the center of the pin 12. The forward link 2 is connected to the second base 9 by the pin 12. At the upper end of the rearward link 3 and substantially parallel to the forward link 2, the second base 9 is pivotably supported by the pin 13 so that both the second base 9 and the rearward link 3 can rotate relative to each other around the center of the pin 13 and the rearward link 3 is connected to the second base 9 by the pin 13. An imaginary line connecting the central points of each pin from pin 14, the pin 15, the pin 13 and the pin 12 from the pin 12 forms a four sided shape that is substantially a parallelogram. The forward link 2 and rearward link 3 change the shape of that parallelogram by rotating around the center of each of their respective pins namely pin 14 and pin 15. Also, when the cover B is opened, the compressed spring 8 widens the parallelogram and the second base 9 rises parallelly. When narrowed, the second base 9 lowers compresses the spring 8. Therefore, it is possible to adjust the rising and lowering movements of the platen cover B by changing the shape of the parallelogram. Because the widening of the parallelogram is restricted by the clockwise rotation of the forward link arm 2, the second base 9 will not move to a position that is higher. The platen cover B also opens and closes by the rotation of the second base 9 in relation to the rotation of arm 4. Therefore, arm 4 functions as the rotation member for the opening and closing of the cover B. The distance of the vertical movements of the second base 9 depends on how wide the edges of the parallelogram are separated. Consequently, the thickness of the original documents which can be pressed and held in place by the cover B depends on how wide the edges of the parallelogram open. This, therefore, requires that the distance of the space between the forward link 2 and the rearward link 3 correspond to the thickness of the document which is to be copied.

Figure 1B:
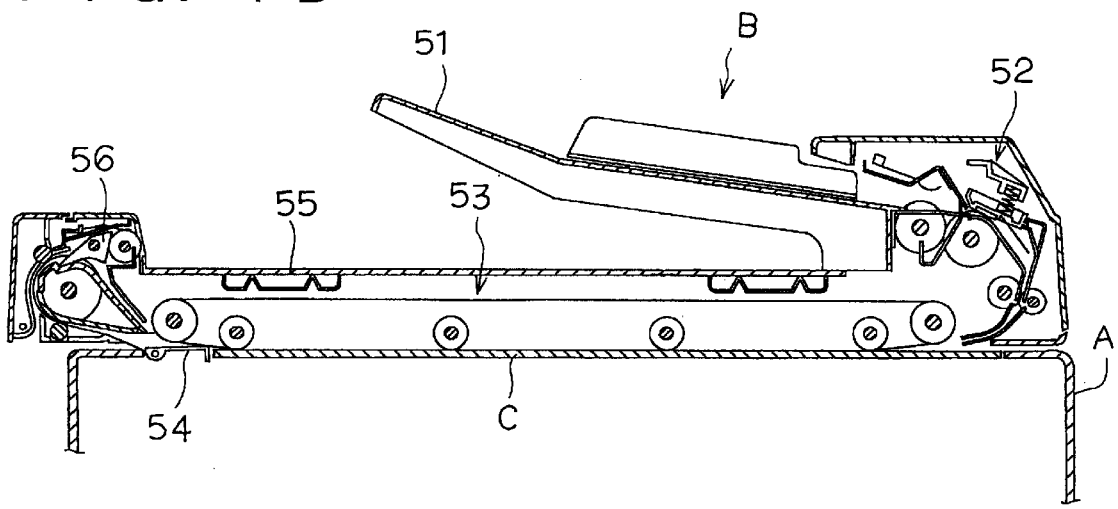
FIG. 1B is a perspective side view of an automatic document feeder.
Figure 2A:
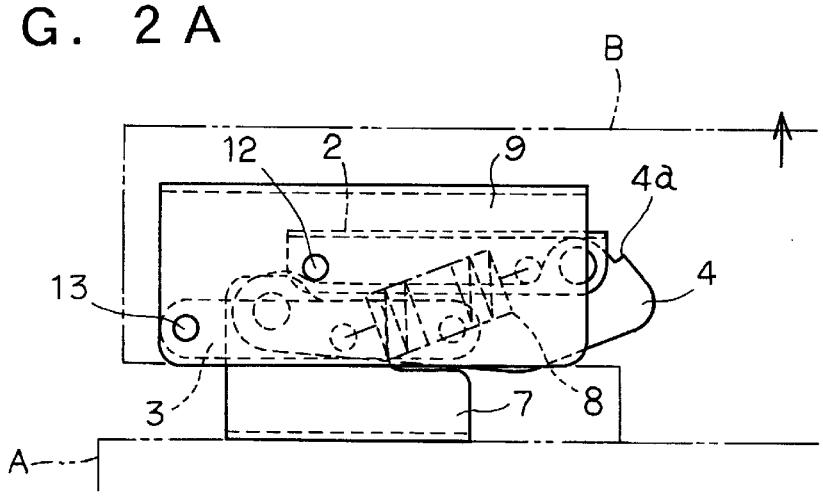
FIGS. 2A, 2B and 2C are perspective side views of the hinge apparatus showing the transition of the platen cover rising.
Figure 2B:
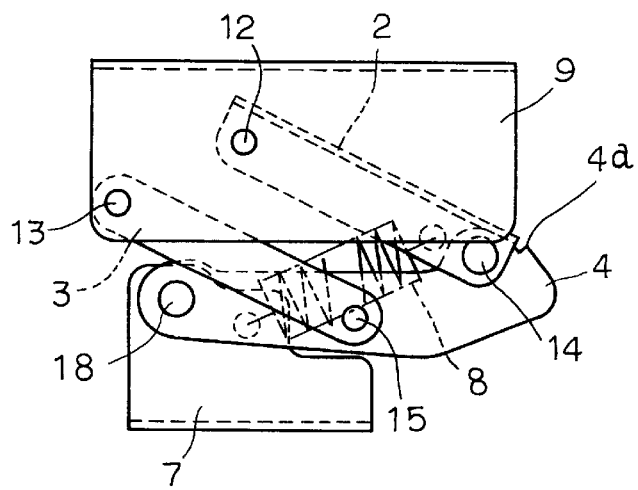
Figure 2C:
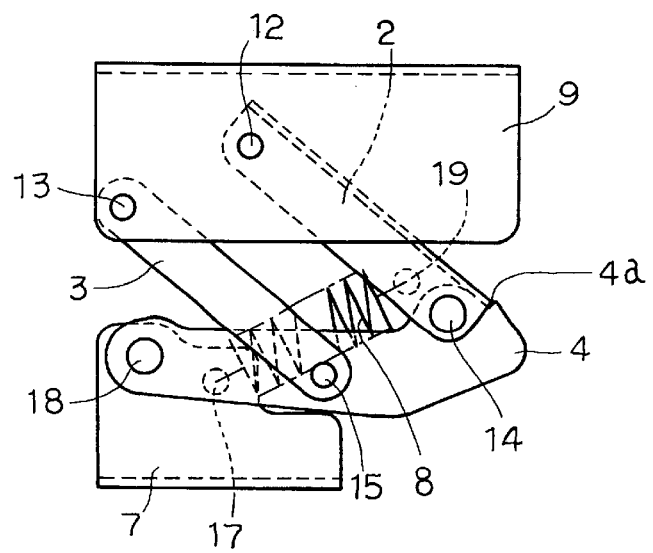
Figure 3A:
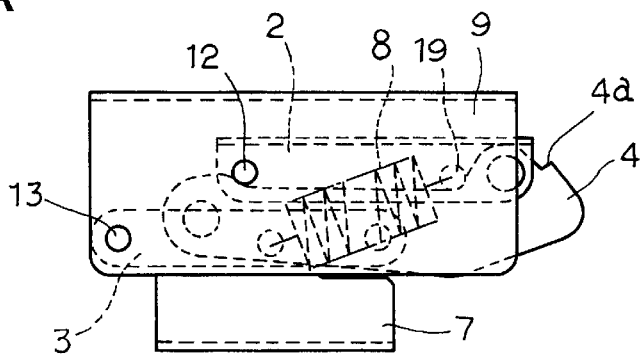
FIGS. 3A, 3B and 3C are perspective side views of the hinge apparatus of the present invention showing the transition of the movement of the hinge apparatus on the platen cover.
Figure 3B:
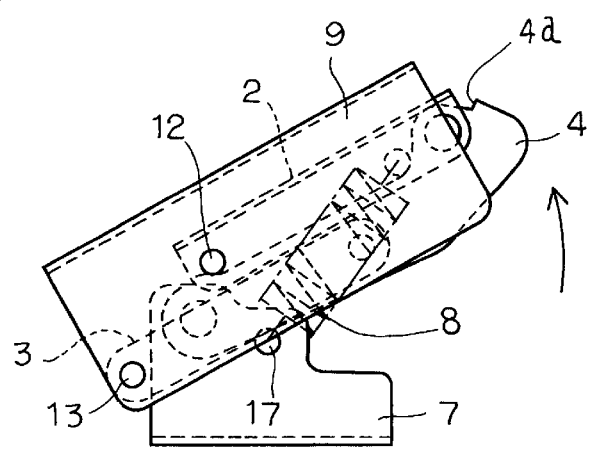
Figure 3C:
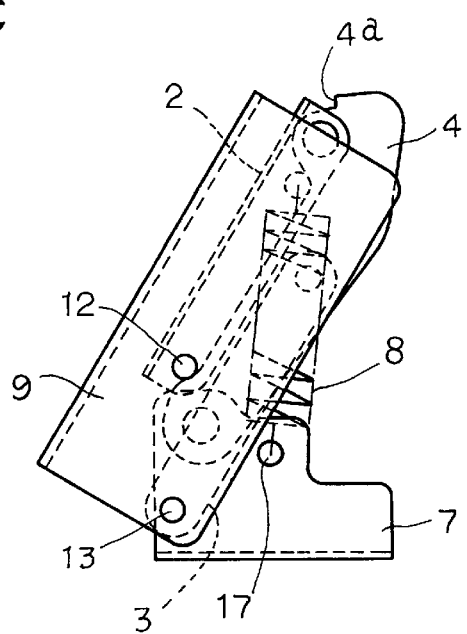
Figure 4A:
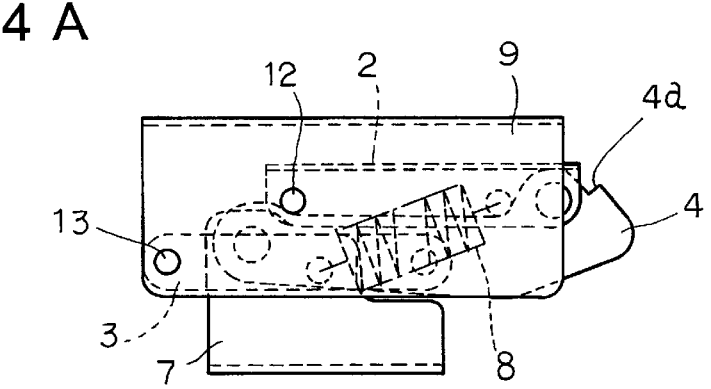
FIGS. 4A, 4B and 4C are perspective side views of the hinge apparatus of the present invention showing the transition when raising the hinge apparatus parallel to the platen cover.
Figure 4B:
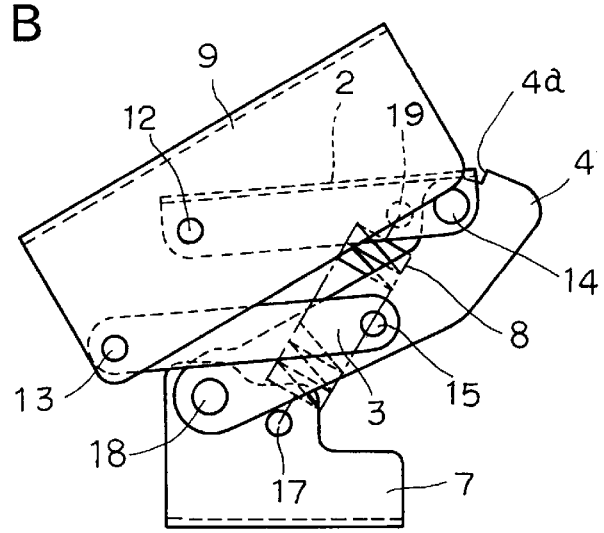
Figure 4C:
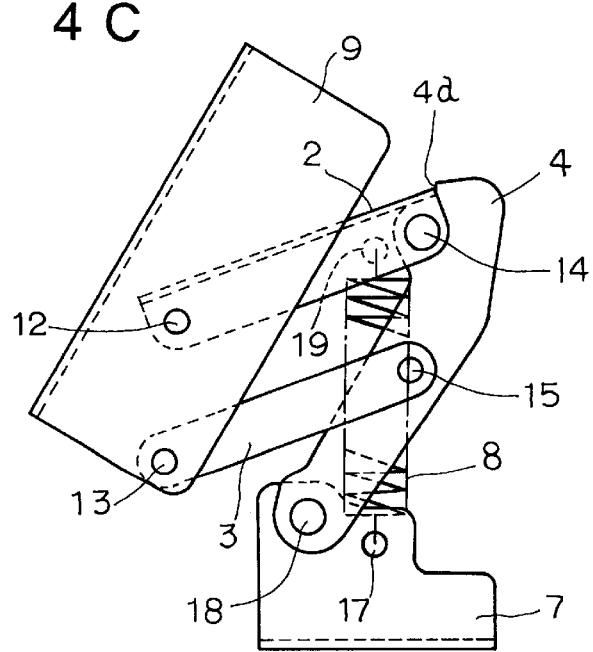

The following provides a detailed description of the hinge apparatus 1 using FIG. 2, FIG. 3 and FIG. 4. As is shown in FIGS. 2A, 2B and 2C, the process of the forward link 2 and the rearward link 3 rotating relative to the arm 4 to enable the parallel movement of the second base 9 and concequently the cover B from a closed and un-rotated state. Through this, it is possible to raise and to keep the cover B parallel to the platen C surface on the upper portion of the device A. In FIG. 3, the forward link 2 and the rearward link 3 are not rotating, in other words, the second base 9 and the arm 4 do not change the positions relative to each other. Rather, only the arm 4 rotates around the center of the hinge 18 to move the cover B from a closed state to an open state (which is the hinging action). FIG. 4 shows a combination of the actions performed in FIG. 2 of the rotation of the forward link 2 and the rearward link 3 and in FIG. 3 of the rotation of the arm 4 to show the process of the up and down actions and the opening and closing rotations of the second base 9. In this way, the hinge apparatus 1 as described in FIG. 1 can be independently and simultaneously raised and lowered in parallel to the original platen and can perform the hinging action of the cover B. Therefore, it is possible to ensure that the up and down position of the cover B corresponds to the thickness of the book, when closing the cover B onto a thick book which has been placed on the platen surface on the upper part of an image forming apparatus. Also, this mechanism which employs the parallel and up and down movements of the arms 2 and 3 on the arm 4 to allow this hinging action, the cover B can be closed under the same status in which it is open, thus making it easy to lower the cover in a direction that is parallel to the platen surface thus leaving the original undamaged.

If the cover B also performs the function of being an automatic document feeder to automatically and sequentially transport documents over the platen C, that automatic document feeder device would be structured like the apparatus shown in FIG. 1(B).

To provide an explanation of how such an apparatus should function, the automatic document feeder would include the sheet separator means 52 to take one sheet at a time from a plurality of sheets stacked on the feed stacker 51 and sequentially transport them to the platen C for processing. At this point, the transport means 53 transports the document to abutment with the stopper 54 established on the image forming device to be set on the copy machine. After the copying process is completed on this device, the stoppers 54 retracts to allow the transport means 53 to drive the sheet through the discard means 56 to stop the sheet at the discard stacker 55.

Figure 5:
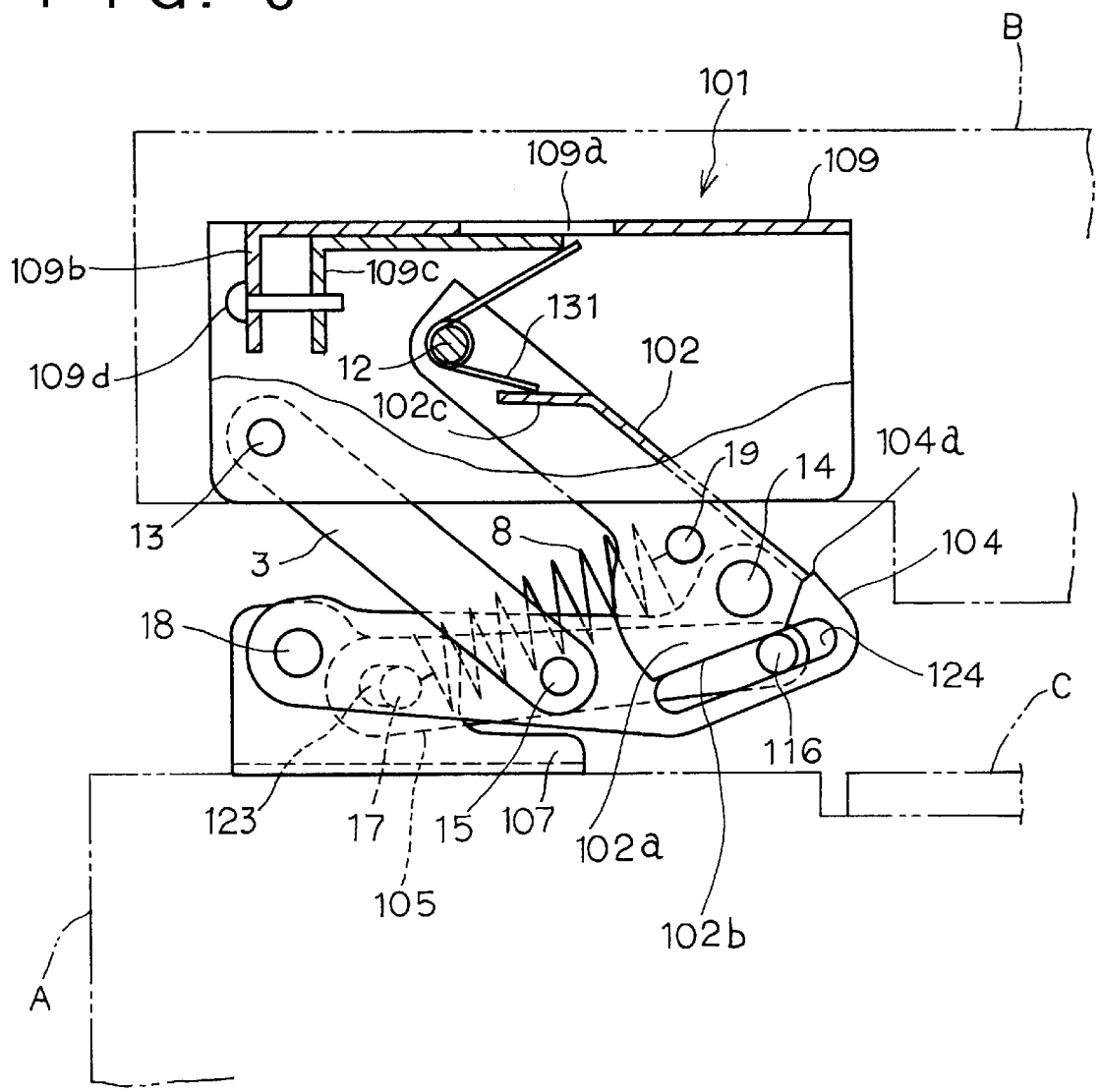
FIG. 5 is a partially sectional side view of the hinge apparatus 101 of the present invention showing the determined sequential movements relating mutually to the rising action of the hinge apparatus by the lock arm mechanism.

The hinge apparatus 1 as described in FIG. 1 allows the independent vertical movement of the hinge action of the cover B, as explained using FIG. 2, FIG. 3 and FIG. 4. FIG. 5 shows that it is possible for the hinge apparatus 101 to combine the hinging action and the up and down action of the second base 9 to open and close and raise and lower the cover B through a determined sequence by restricting the up and down movement according to the status of the hinging action.

Here, we refer to the perspective view of the hinge apparatus 1 of FIG. 5 to explain the differences from the hinge apparatus of FIG. 1, namely that the lock arm 105 which provides a part of the movement control means. The pin 116 and the spring 131 have been newly added to the structure of the hinge apparatus of FIG. 1. The shapes of the forward link 2, the arm 4, the base 7 and the second base 9 have been changed and each of the forward link 102, the arm 104, the base 107 and the second base 9 have been placed in different locations.

Base 107 is connected to one end of the arm 104 by pin 18 that pivotably supports the arm 104, in the same way as was explained in reference to to FIG. 1. The arm 104 has an elongated slide aperture 124 established in a part of the arm 4 of FIG. 1 and a ridge to limit the clockwise directional rotation of the forward link arm 102. Also, forward link 102 has the cam 102a protruding on one side of the area around arm 104. This cam mechanism moves by the rotation of the cam 102a by corresponding to the rotation of the forward link 102 around the pin 14. The stopper 102c is provided on the forward link 102 to support one end of the spring 131 wound around pin 12. The lock arm 105 has a slightly elongated slide aperture 123 into which one end of the hole pin 17 is inserted. The pin 17 is supported by the base 107. The pin 116 supports the other end of the lock arm 105 and is inserted into the slide aperture 124 of the arm 104. Therefore, the lock arm 105 has suitable room to move slightly along the slide aperture 123. The slide aperture 124 and the lock arm 105 rotates around the centers of the pin 17 and the pin 116 according to the rotation of the arm 104. The substantially straight sided cam section 102b is formed on the cam 102a of the forward link 102. The pin 116 is in constant contact with the straight sided cam section 102b on the cam 102a to limit the rotation of the forward link 102 in the counterclockwise direction. The attachment position of the slide unit member 109c established at the opening 109a and screw attachment unit 109b is variable by the screw 109d in the second base 109. Therefore, the speed of the cover B that rotates around the center of the pin 12 is slowed in the closing direction because the end of the spring 131 is pressed against the slide unit member 109c. It is possible to change the speed of the cover B in the closing direction by changing the position of the slide unit member 109c by turning the screw 109d. Because other explanations of this hinge apparatus continue to be the same as those described in our reference to FIG. 1, they shall be omitted.

Following is an explanation of FIG. 6 to FIG. 8 which show, in order, the progression of the hinge apparatus 101 from the closed state of cover B that is attached to the second base 109, or in other words, from the un-inclined and horizontal state of the second base 109 to the cover B opening and further to the opened state and back again to the original closed state of cover B. Here, it is clear that the lock arm 105 and the cam 102a on the forward link 102 adjust the distance of the forward link 102 and rearward link 3 according to the rotating position and rotating direction of the arm 104 to allow the rising and lowering and the hinging action of the cover B in one fixed sequence.

Figure 6A:
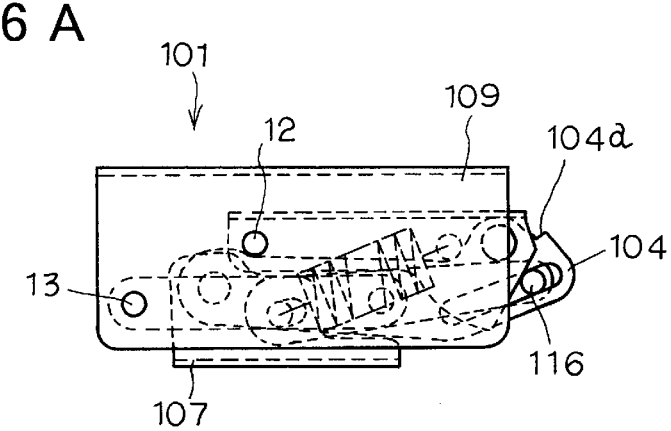
FIGS. 6A, 6B and 6C are perspective side views of the hinge apparatus 101 showing the transition when opening the hinge apparatus from a closed state on the platen cover.

Here, we will explain in detail the effects of the mechanisms and the sequences in their order beginning from FIG. 6. FIG. 6(A) shows the closed state of the cover B. Furthermore, FIG. 6(A) shows the hinge apparatus 101 substantially touching and pressing the cover B against the platen C with either no document on the platen C or a very thin sheet document on the platen C. In this situation, arm 104 is laying substantially in a horizontal direction. Cam 102a is rotated to its maximum in the counterclockwise direction and the substantially straight sided cam section 102b pushes the pin 116 into the right direction of the FIG. Therefore, the angles formed by the axes of the pin 18 and the pin 14 and the pin 14 and the pin 12 are at their minimum. This is where the forward link 102 and the rearward link 3 are in their closest proximity and the second base 109 is precisely at its lowest point. The pin 116 is also slid into the right direction of the FIG along the slide aperture formed by the slide aperture 124. On one end of the lock arm 105 is established the slide opening 123 which controls the movement of the lock arm 105 through the contact of the pin 17. This, then, forces the lock arm 105 to its furthermost right position.

Figure 6B:
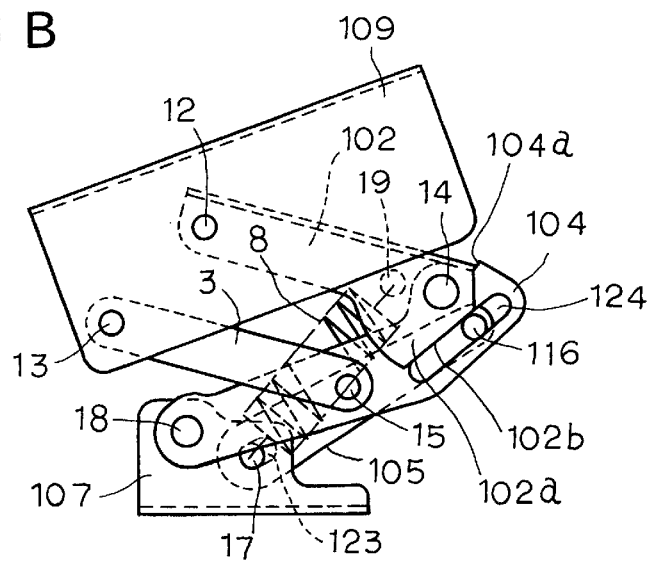
Figure 6C:
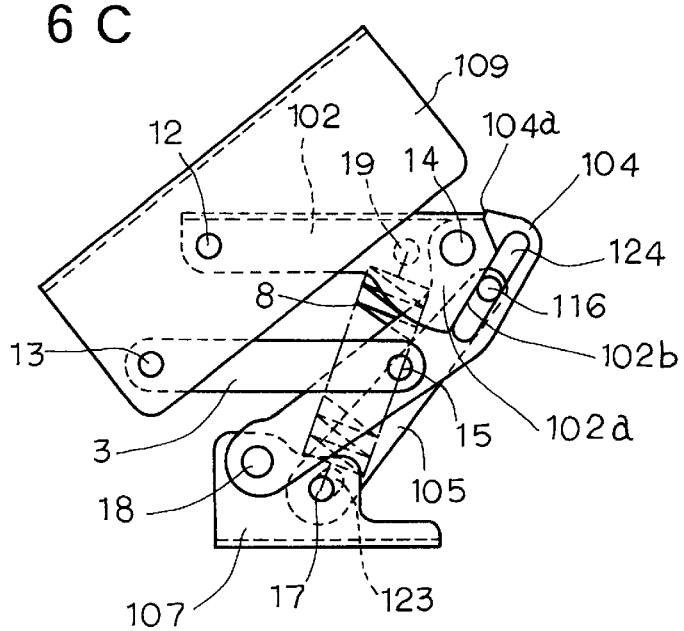

The force generated when the operator opens the cover B, transmits the moment to the arm 104 to cause the rotation of the arm 104 in the counterclockwise direction, as shown in FIG. 6(B) and FIG. 6(C). Following that rotation, the lock arm 105 rotates in the same way centering around pin 17 in the counterclockwise direction. The forward link 102 receives the moment of the counterclockwise rotation centered around the pin 14 by the force of opening the cover B which causes the straight sided cam section 102b to push the pin 116 on the lock arm 105 toward the opposite position of the pin 117. The lock arm 105 then rotates toward the opposite direction in this angled state. Because the pin 17, which is the axis of rotation of the lock arm 105, is established at a position separated from the pin 18 which is the axis for the rotation of the arm 104, the position of the pin 116 rotates to the right while moving to the left relative to the pin 14 following the counterclockwise directional rotation of the arm 104. The pin 14 and pin 116 follow the same arc. Therefore, the pin 116 moves in a direction relative to the pin 18 along the slide aperture 124 while remaining in contact with straight sided cam section 102b. Because the straight sided cam section 102b of cam 102a is thus pushed from the slide aperture 124 cam 102a rotates in the clockwise direction centering around the pin 14. The result is that the forward link 102 rotates in the clockwise direction of the pin 14 with the opening of the cover B. Therefore, the second base 109 is capable of moving parallelly to the platen in the vertical direction and the cover B rises as the angles of the parallelogram as formed by the points of the centers of each of the pins of the pin 12 to the pin 14, the pin 15, the pin 13 and the pin 12 again, increase. In this way, in response to the angle of the opening of the cover B, the cover B hinge action and rising action are brought into a meaningful relationship because the position of the pin 116 differs with respect to the arm 104 and the forward link 102. Also, as shown in FIG. 6(C), when the arm 104 rotation angle is reached, the straight sided cam section 102b of the cam 102a is substantially parallel on the elongated direction of the slide aperture 124. Rotating the arm 104 any further almost completely ceases the movement of the enlarging of that parallelogram. Because the one side 104a of the arm 104 pushes at a constant against the forward link 102a in the clockwise direction, the second base 109 does not move parallel to the upward direction any further. Therefore, as shown from FIG. 6(A) to FIG. 6(C), the rotational movement and the rising movement occur simultaneously when the cover B is opened.

Figure 7A:
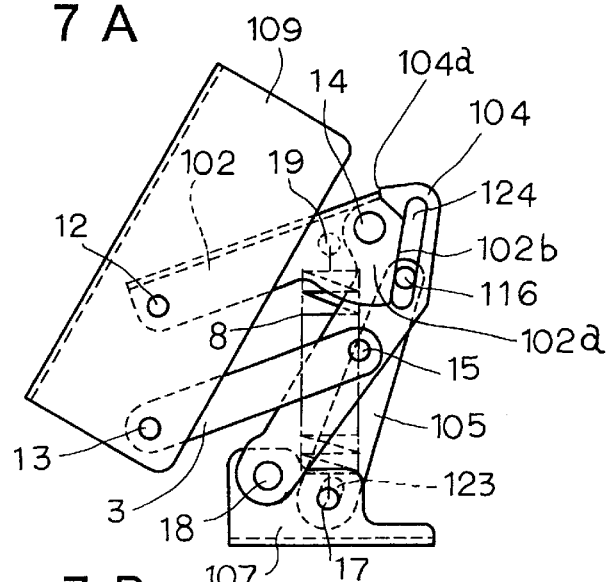
FIGS. 7A, 7B and 7C are perspective side views of the hinge apparatus 101 showing the transition continuing from FIG. 6A, FIG. 6B and FIG. 6C of the platen cover closing after opening to a maximum.
Figure 7B:
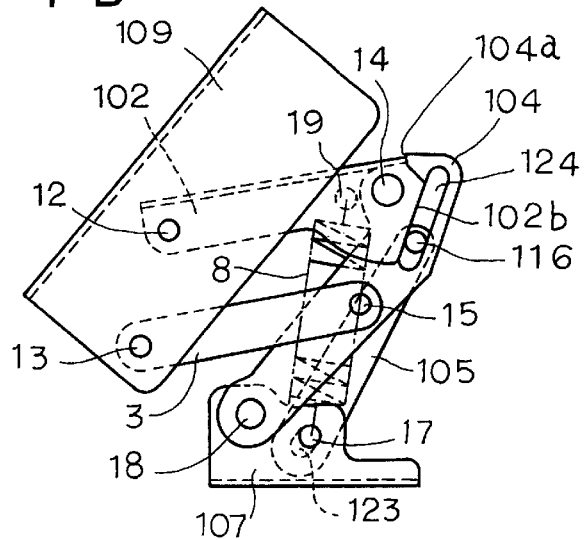
Figure 7C:
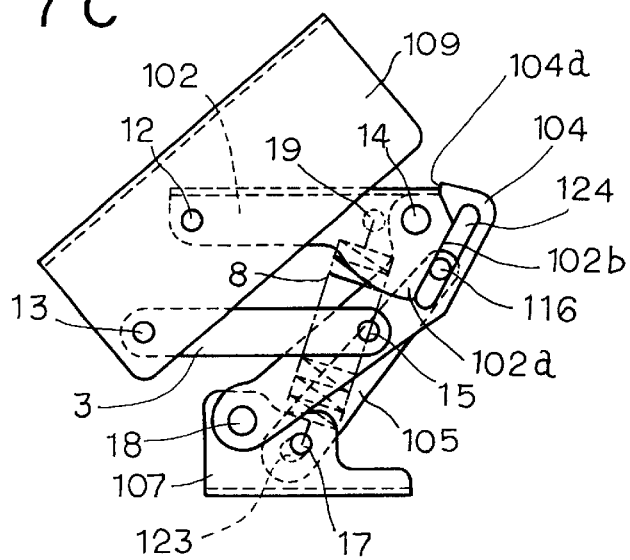

FIGS. 7(A) to (C) show the process of closing the cover B from after it has been opened. FIG. 7(A) shows the cover B opened further to its maximum limit from FIG. 6(C). Arm 104 moves all the way to the left rotation (also called counterclockwise rotation) and along with that movement the pin 116 attached to the lock arm 105 moves to its furthest in the direction relative to pin 18 along the slide aperture 124. However, because the straight sided cam section 102b is substantially parallel with the slide aperture 124, there is less outward push by the pin 116 at the slide aperture 124 of cam 102a. Therefore, in the processes from FIG. 6(C) to FIG. 7(A), there is almost no change in the position of the second base 109 relative to the arm 104 and the rise is substantially stopped only by opening the cover B. When the cover B is later closed from an open state, the lock arm 105 lowers in the direction of the base 107 under its own weight as shown in FIGS. 7(B) and (C) and the pin 116 moves only slightly in the direction of pin 17. If the lock arm 105 does not lower under its own weight, the force of pressing the cover B causes a moment to occur in the clockwise rotation direction on the forward link 102 and pin 116 receives that force in the downward direction from the straight sided cam 102b. The lock arm 105a lowers, then, in the same way toward the base 107.

Figure 8A:
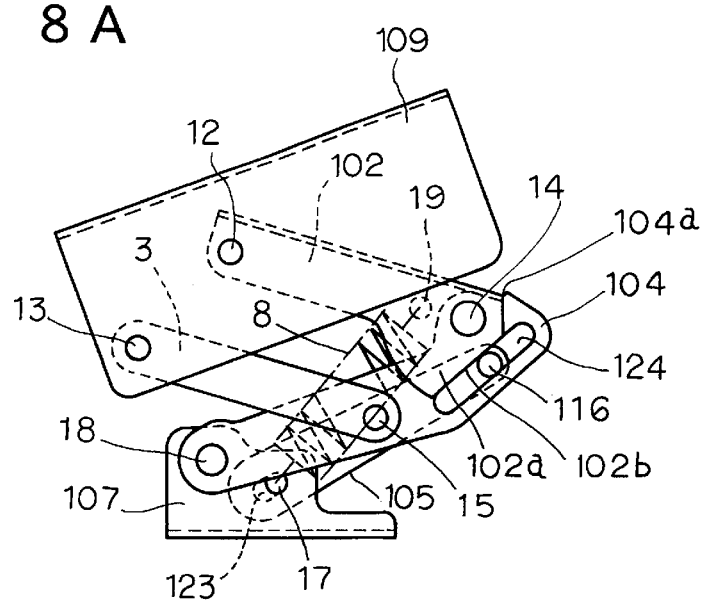
FIGS. 8A, 8B and 8C are perspective side views of the hinge apparatus 101 showing the transition continuing from FIGS. 7A, 7B and 7C of the platen cover closing further and returning to its original status.
Figure 8B:
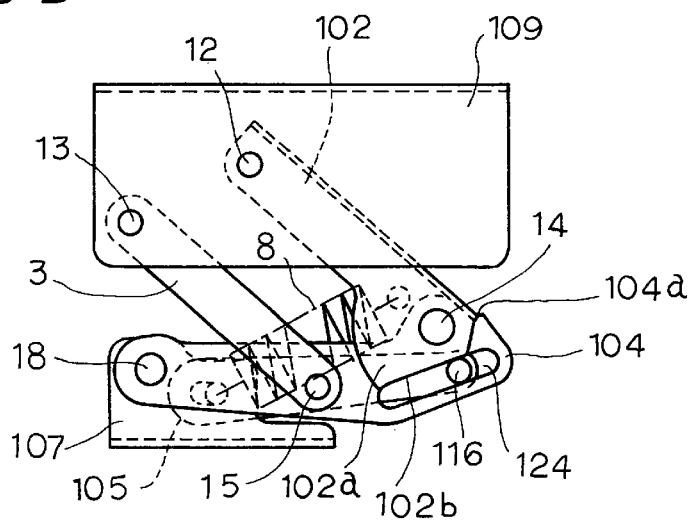
Figure 8C:
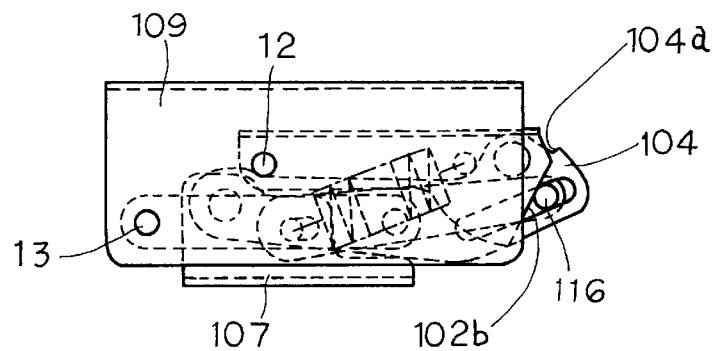

FIG. 8(A) and FIG. 8(B) show the cover B in a closed state in FIG. 7(C) and the end state in which the cover B is parallel with the platen C. Here, the lock arm 105, as explained while referring to FIGS. 7(B) and (C), is positioned slightly away from the pin 18 direction. The effect to the position of the second base 109 by the slight difference in positioning is increased as the arm 104 moves toward its original position. Therefore, the return rotation action of the cam 102a on the forward link 102 is restricted by the pin 116 displaced in the direction of the pin 17, and the forward link 102 and the rearward link 3 are opened and parallel. The result is that the cover B is held in a state that is a parallel distance with regard to the platen C.

Also, supplying a downward force to the cover B causes that force to be applied to the forward link 102 and the rearward link 103 at the moment of the counterclockwise rotation centered around the pin 14 and the pin 15. Because of that moment, the straight sided cam section 102b applies a force that moves the pin 116 in the opposite direction to that of the pin 17 along the slide aperture 124 thereby moving the lock arm 105. The movement of the lock arm 105 and the pin 116 rotate the cam 102a further in the counterclockwise direction and the rearward link 103 and the forward link 102 rotate around the pin 14 and pin 15. Therefore, the second base 109 and the cover B which is therein attached lower downward and parallel in order. If a thick document has been set on the platen C, the lowering is limited at the position contacting the upper surface of such document and the lower surface of the cover B pushes parallelly to the upper surface of that thick document.

As explained above, the differences in the opening and closing angle and the opening and closing directions of the cover B cause differing positions of the pin 116 with regard to the arm 104 and forward link 102. There is a then a causal relationship between the rising and the opening rotation of the cover B because of the series of predetermined sequences in that action. Also, when the cover B is changed from a closed state to an opened state, it moves parallel along with a rotating movement and when the cover B is changed from the opened state to the closed state it rotates until the cover B has a uniform and parallel distance from the platen C and lowers while maintaining that parallelism.

Continuing along with our explanation of the present invention, we will explain the compression spring 8 which is established within the above described apparatus. Referring now to FIG. 1 and FIG. 5, one end of the spring 8 is attached to the pin 17 on the base 7 and the other end of the spring 8 is attached to the pin 19 which is connected to the forward arm 2. We will consider, here, that the hinge apparatus 1 and the base 7 of 101 are attached to the copy forming device A and that the cover B is attached to the second base 9 and 109. The cover B extends in the length direction in FIG. 1 from the second base 9 and 109. Also, the weight of the cover B supplies the moment of force in the clockwise rotational direction with regard to the arm 4 and 104. Also, because the center of gravity of the cover B is at the position away from the second base 9, there is a difference in the moment exerted to arm 4 and 104 by the situation of the opening and closing of the cover B. For example, in order to make the cover B parallel with the platen C, the arm 4 and 104 must be substantially horizontal which is where there is the greatest rotational moment applied to the arm 4 and 104. Conversely, when the cover B is opened in the vertical direction, arm 4 and 104 receive the weakest rotational moment. Therefore, the spring 8 is employed to enable a resilient opposing force to resist the rotational moments that vary according to the status of the opening and closing of the cover B. Also, in the hinge apparatus 1 as described for FIG. 1, a resilient member is used to resist the forward link 2 and rearward link 3 rotational moments in the counterclockwise direction centering around the pin 14 and the pin 15 caused by the weight of the cover B. Also, if the degree of compression of the spring 8 is great, any compressing means whose repelling force is accordingly great, such as a cylinder in which compressed air is sealed can be used. It is also possible to set that pressing force in accordance with the weight of the cover B.

Next, we will refer to FIGS. 2 through 4 and FIGS. 6 through 8 to describe the action of the spring 8. With regard to the up and down movements of the second base 9 as shown in FIG. 2, the cover B is attached to the second base 9 so that the weight of the cover B is placed upon the second base 9. The weight on the second base 9 operates as the moment of force to rotate in the counterclockwise direction centering around the pin 14 and the pin 15 with regard to the forward link 2 and the rearward link 3. Therefore, the spring 8 is established between the base 7 and the forward link 2 to resist that moment and support the weight of the cover B to allow the up and down movements of the cover B with little resistance felt by the user.

One end of the forward link 2 side of the spring 8 is separated from the pin 12 and it is attached to the pin 19 which is attached near the pin 14. It is possible with this structure to supply a substantially uniform pushing force to the pin 19 with regard to the cover B weight without any variation in the expanding or contracting of the spring 8 even if the forward link 2 is rotated to raise or lower the cover B. Therefore, by rotating the forward link 2, the variation in the spring 8 affects the arm 4 rotating movement only slightly.

The rotational moment weakens in the order shown from FIG. 3(A) to FIG. 3(B) to FIG. 3(C) with regard to the opening and closing movement of the second base 9 in FIG. 3. Therefore, in resistance to the rotational moment, and to prevent the cover B from closing easily, the force of resistance must be reduced. Because the spring 8, as described previously, utilizes the expanding force that is generated with relation to the degree of compression, the repelling force is greater if the compression is greater. Therefore, the spring 8 is attached between the base 7 and 107 and the forward link 2 and 102 so that the repelling force is at its greatest when the cover B is in the states shown in FIG. 3(A) and FIG. 6(A) and the repelling force is at its weakest when the cover B is in the states shown in FIG. 3(C) and FIG. 7(A). For example, in FIG. 1 and FIG. 5, one end of the base 7 side of the spring 8 is separated from the pin 18 and it is attached to the pin 17 established lower than a straight lining formed between the pin 18 and the pin 14. The compression of the spring 8 is greatest and the repelling force is greatest when the cover B is closed and when the arm 4 and 104 are horizontal as can be seen in FIG. 3. Conversely, the spring expands thereby decreasing its repelling force when the cover B is rotated in the direction of opening the cover B. At this point, there is a separation between the pin 17 and the pin 19 by the opening. When the cover has opened to its maximum state, as is illustrated by FIG. 3(C), the repelling force is at its weakest.

Thus, it is possible to receive both the moment of rotation of pin 14 caused by the weight of the cover B which moves up and down and open and closed and the moment of rotation of pin 18 by establishing one spring 8 between the base 7 and 107 and the forward link 2 and 102 for the hinge apparatus 1 and hinge apparatus 101. Also, because in the hinge apparatus 101 shown in FIG. 5, the pin 116 on the lock arm 105 moves inside the slide aperture 124 by the rotational movement of arm 104 centered around pin 18 in the sequences of movement as shown in FIG. 6(A) through FIG. 8(C). With the change in the size of the parallelogram formed by the forward link 102 and rearward link 3, the cover B moves up and down and there is a decrease in the weight placed on the spring 8 by the rotational moment of the pin 14. Thus, there is less resilience and while it is possible to use a small spring, it is possible to improve the opening and closing operation of the cover B by reducing the load on the cover B.

Figure 9:
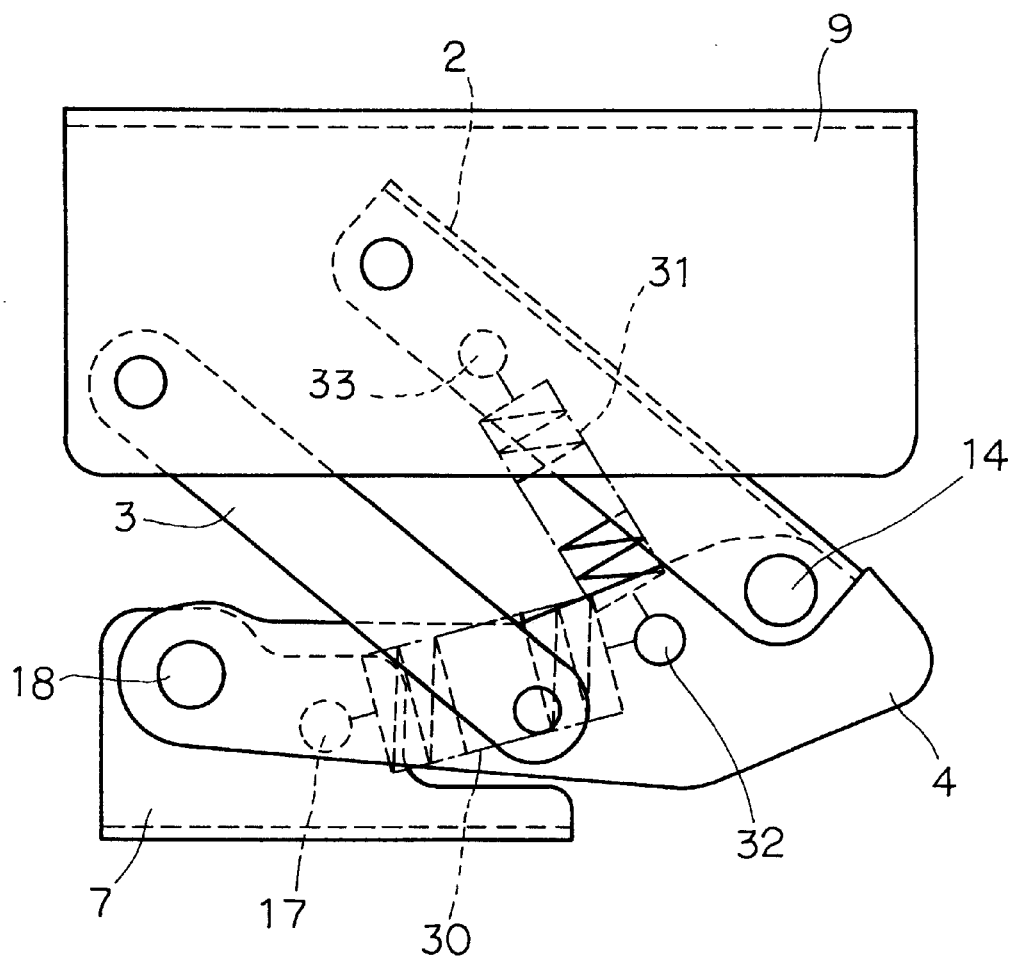
FIG. 9 is a perspective side view of the hinge apparatus showing the use of two springs in place of the spring 8 in the hinge 1 shown in FIG. 1.

In place of the spring 8 for the hinge apparatus 1 in FIG. 1, we will explain using 2 new springs 30 and 31. FIG. 9 shows the construction of the pin 17 pivotably supported on the base 7, the pin 32 pivotably supported on the arm 4 between which is attached the spring 30 and between the pin 32 and the pin 33 pivotably supported by the forward link 2 is attached the spring 31. Both the spring 30 and 31 have the repelling force to push in the outward direction. Therefore, the spring 30 causes the moment to rotate the arm 4 in the counterclockwise direction from the position in the drawings centered around the pin 18 and the spring 31 causes a moment to rotate the forward link 2 in the clockwise direction centered around the pin 14. The repelling force of the spring 30 is at its strongest when the arm 4 is horizontal and the cover B is closed. The repelling force of the spring 30 is at its weakest when the arm 4 is vertical and the cover B is open. There is no great difference in the repelling force of the spring 31 with regard to the up and down movements of the second base 9 because it is pushing the forward link 2 with the pin 32 positioned at a location slightly separated from the pin 14 as the pivoting point.

The function of the spring 8 as shown in FIG. 1 and FIG. 5 is the same as the function of the usage of the two springs 30 and 31 in FIG. 9. Furthermore, as the spring 30 and spring 31 perform the hinging movement of the cover B and the raising and lowering independently, there is no variation in the moment for raising and lowering by the hinging action of the cover B and there is no variation in the moment of the hinging action by the raising and lowering of the cover B. Therefore, the two springs of 30 and 31 in the hinge apparatus are possible if ample space is provided for their attachment. If such an ample space is not available, it is possible to use the one spring 8 as is shown in the hinge 1 and 101 in FIG. 1 and FIG. 5.

Figure 10:
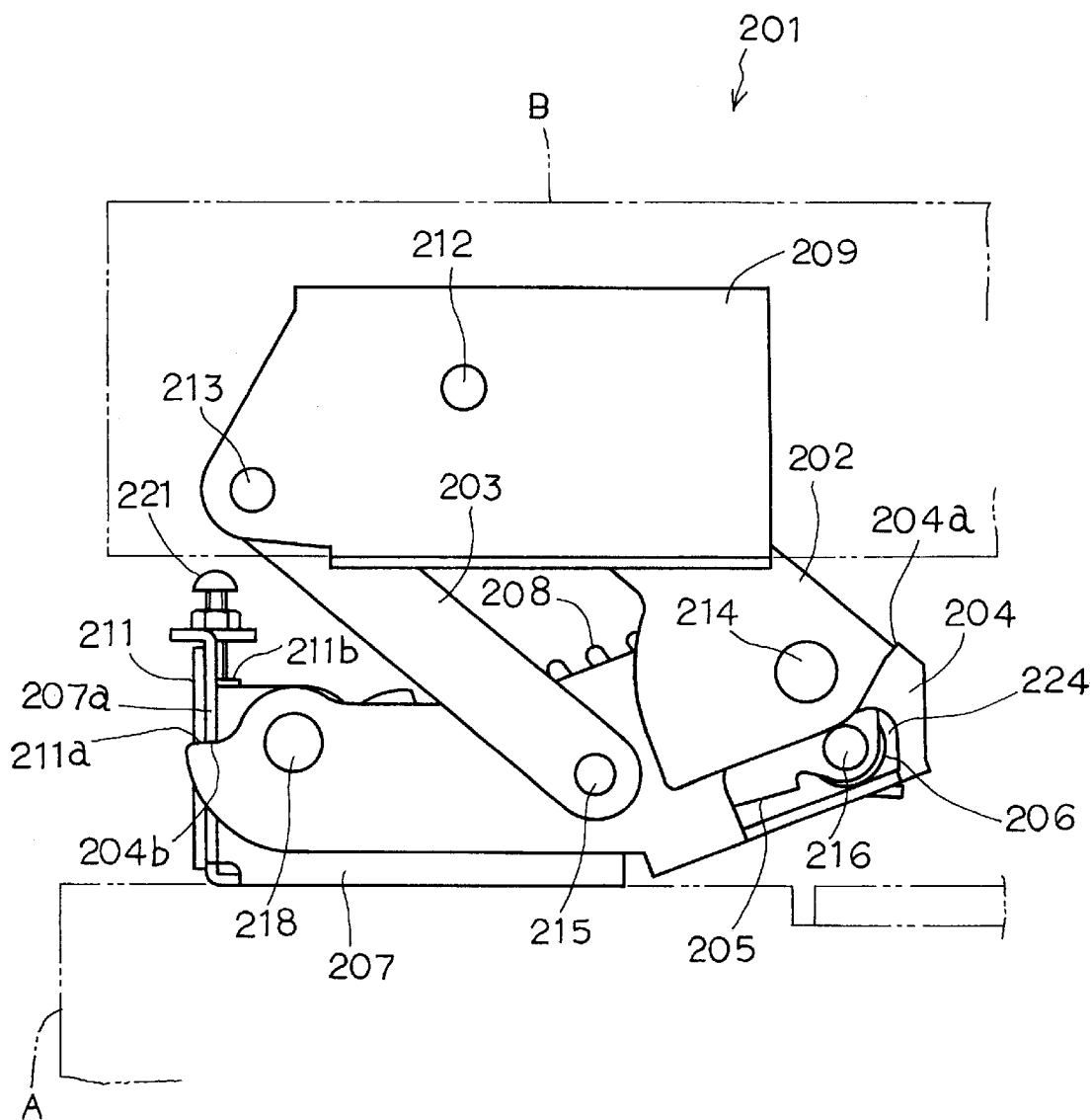
FIG. 10 is a side view of the hinge apparatus 201.
Figure 11:
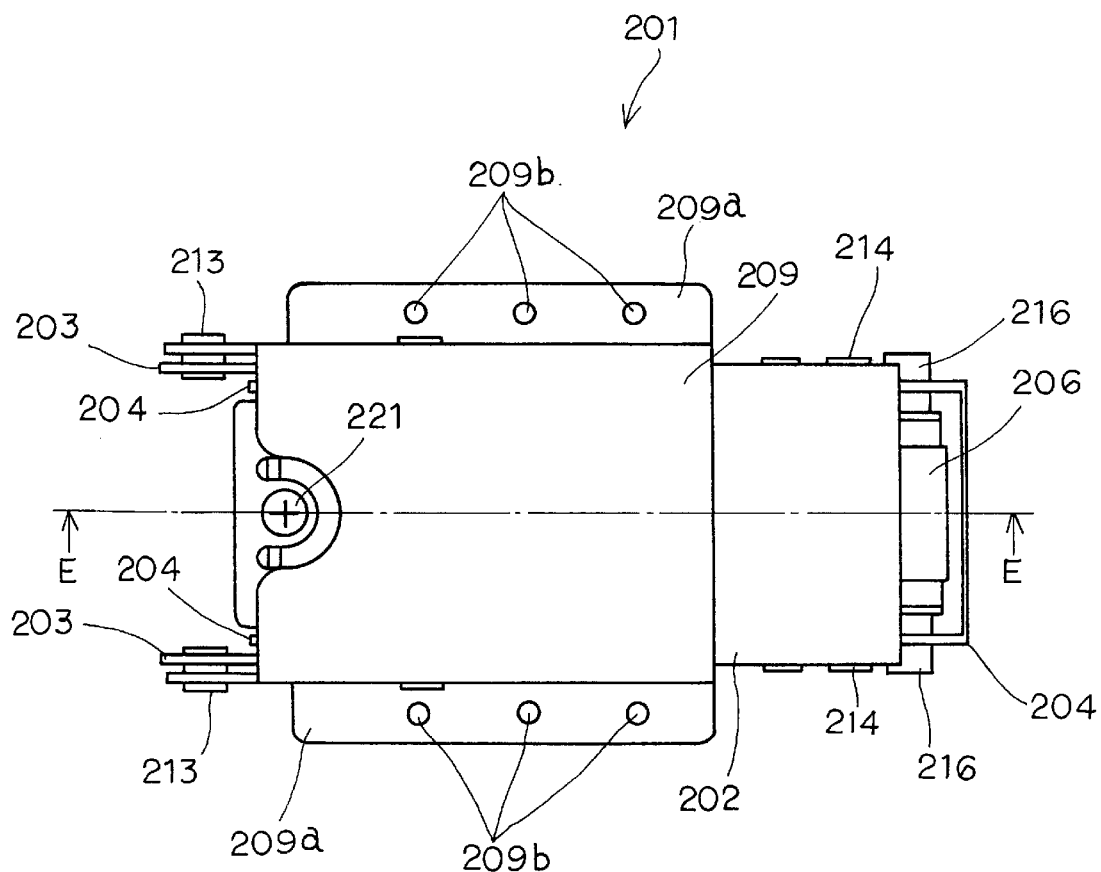
FIG. 11 is a plan view of the hinge apparatus 201.

Here, we will provide an explanation of the hinge apparatus 201 in FIG. 10 and FIG. 11 by comparing to the hinge apparatus 1 and 101 in FIG. 1 and FIG. 5.

Figure 13:
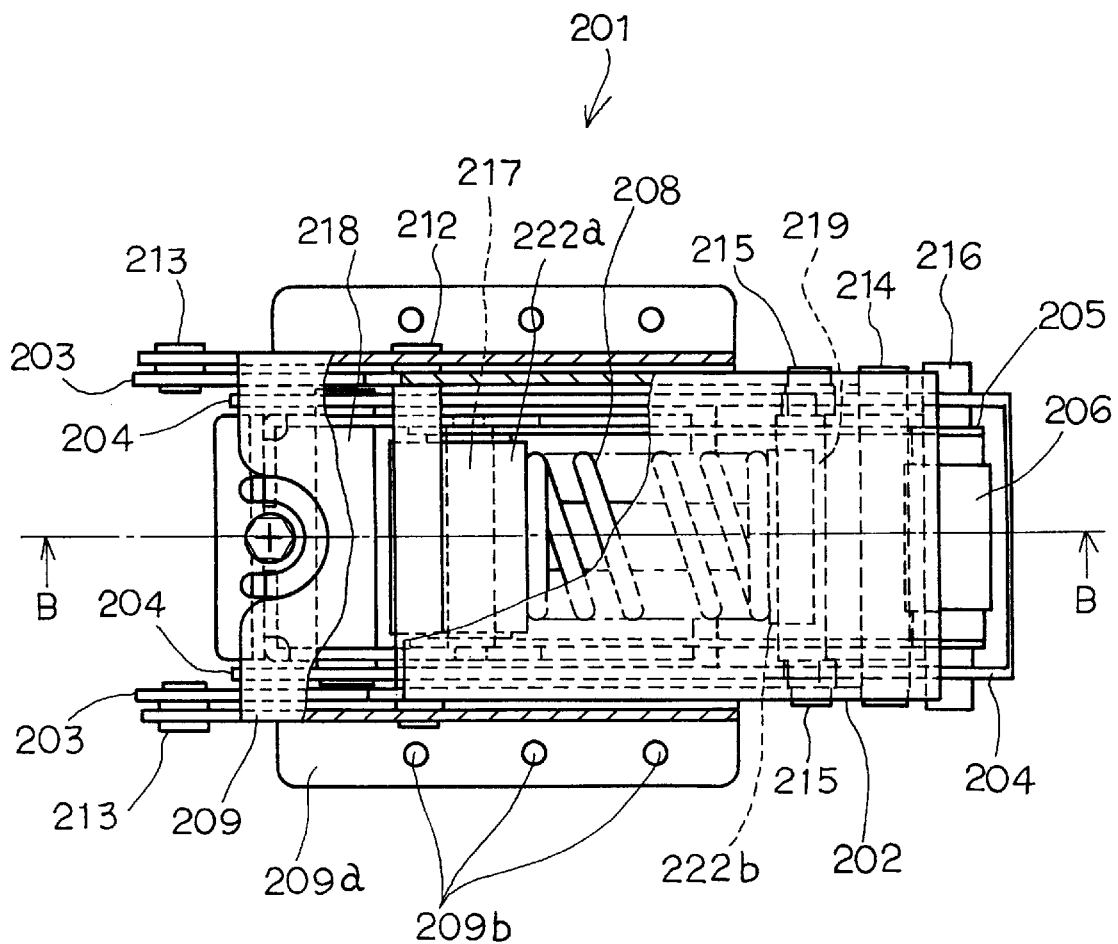
FIG. 13 is a partially sectional view of the hinge apparatus 201.

FIG. 10 and FIG. 11 show the side view and top view respectively of the hinge apparatus 201 and FIG. 12 and FIG. 13 are the perspective side view and the perspective plan view of the hinge apparatus 201. As is clear in the FIGs, the base 207, the arm 204, the lock arm 205, the forward link 202, the rearward link 203 and the second base 209 are established symmetrically along the lines E and E in FIG. 11 and B and B FIG. 13. Particularly, the base 207, the arm 204, the lock arm 205, the forward link 202, the rearward link 203 and the second base 209 are single plates that have been symmetrically bent along the lines E and E. Furthermore, both sides of the side of the apparatus shown in the side views of FIG. 10 and FIG. 12 and the opposing side of that same apparatus each fulfill the same roles of the base 207, the arm 204, the lock arm 205, the forward link 202, the rearward link 203 and the second base 209 as shown in FIG. 5. Also, the two piece plate rearward link 203 is connected to the arm 204 and the second base 209 in the same way as the rearward link 3 in FIG. 5. The second base 209 has the plate 209a expanding outwardly at both ends. A plurality of screw holes 209b are established on the plate 209a. Therefore, a part of the second base 209 is inserted into a part of the cover B having a thickness for opening and closing the platen glass and when the plate 209a on the second base 209 is positioned with a part of the cover B, and a screw is passed through the screw hole 209b to be a screw stopper, the hinge apparatus 201 and the cover B can be linked.

The pins linking each of the composing parts (the pins 212, 213, 214, 215, 216, 217, 218 and 219) correspond to the pins (the pins 12, 13, 14, 15, 16, 17, 18 and 19) in FIG. 5.

Excluding the pin 213 and the pin 215, each pin is one pin extending to both sides of the apparatus and each pin passes through the parts related to the pins to link the parts mutually composing on both sides.

The pin 216 which passes through both sides of the lock arm 205 passes through the slide aperture 224 established at the arm 204. The outer circumference of that pin is in contact with the straight sided cam section 102b of the cam 102a on the forward link 202. Also, inside of the hinge 201 a lock roll 206 is established that rotates on the circumference co-axially with the pin 216. The lock roll 206 rolls along the inner lower surface of the arm 204 because the lock arm 205 and the pin 216 slidingly swing.

Referring to the sectional view of FIG. 12 and the partially sectional view of FIG. 13 a spring 208 equivalent to that of the spring 8 in FIG. 5 is centrally established inside of the hinge apparatus 201. The ends of the spring 208 are connected to the guide 221a and the guide 222b. Furthermore, the guide 221a and the guide 222b are connected to the pin 217 and the pin 219 passing through the inside of the apparatus. The guide 221a and the guide 222b have substantially flat surfaces to accept the entire surface of the spring 208 in order to prevent bending when expanding and contracting the spring 208. The opposite side of that surface when looking from the side is elliptical. Also, the forward link 202 has the lift cam 220 permanently attached to the inside. One side of the lift cam 220 is connected to the pin h19 which transmits the expanding tension force from the spring 208 to the forward link 202.

Returning to FIG. 10, a stopper 211 is established in the hinge apparatus to adjust the position of the arm 204 so that the cover B is parallel with the platen C when it is closed and to restrict the action of the right rotation of the arm 204. Stopper 211 is established along the side wall 207 of the base 207 and has a bent and flat surface 211b at the top. This makes contact with the end of the screw 221 attached to the top part of the side wall 207a.

Figure 14A:
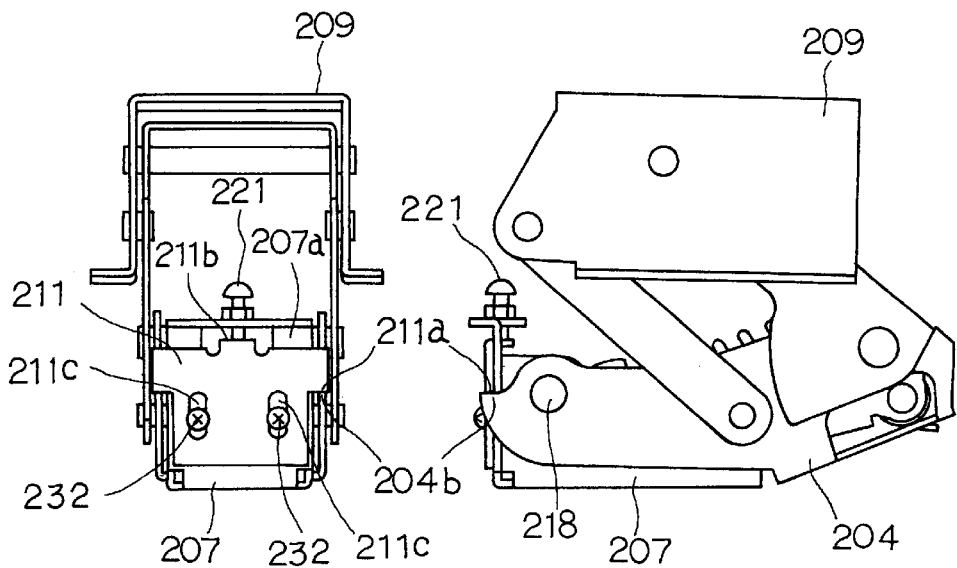
FIGS. 14A, 14B and 14C are a side views of the hinge apparatus 201.
Figure 14B:
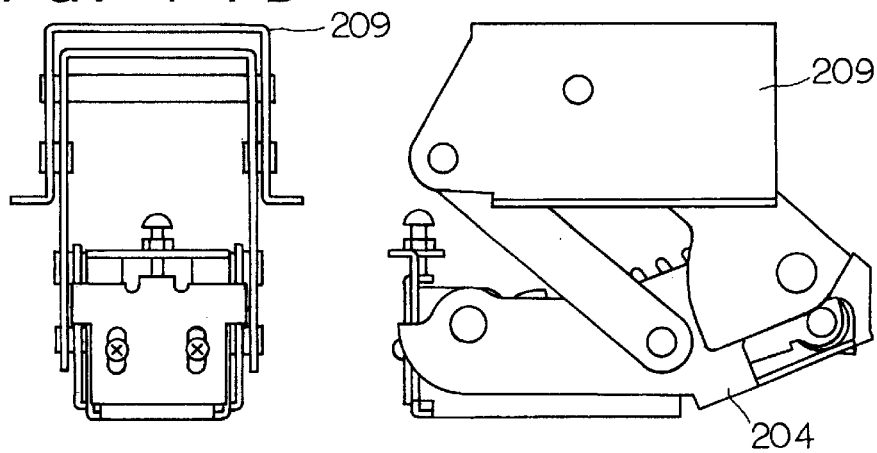
Figure 14C:
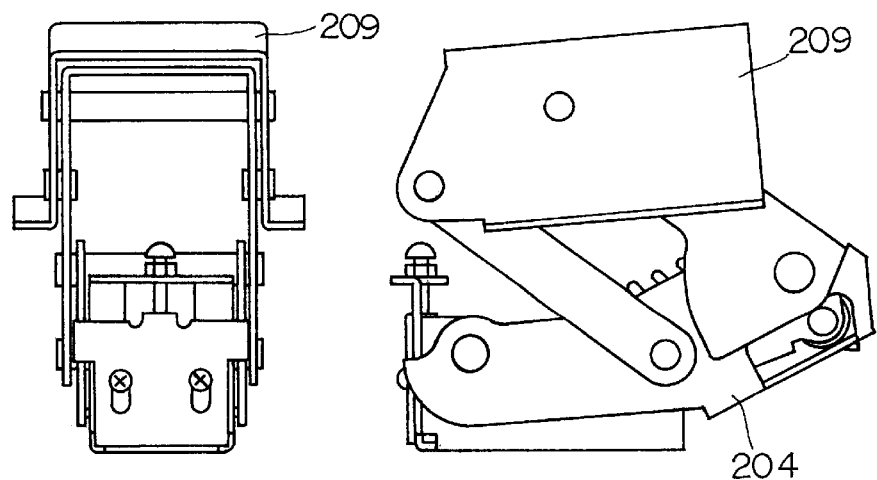
Figure 15A:
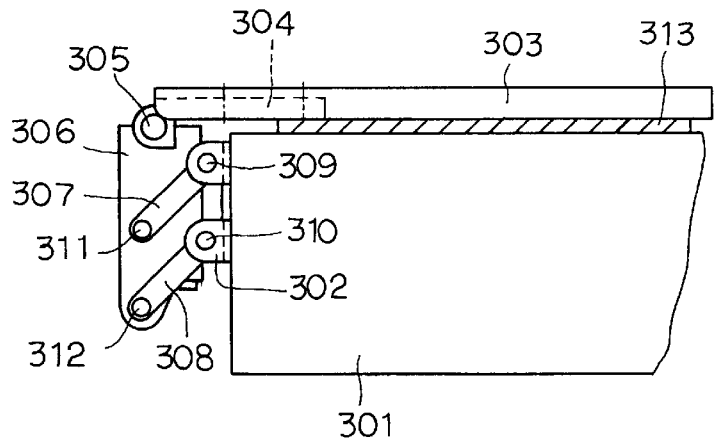
FIGS. 15A, 15B, 15C and 15D show the first prior art hinge apparatus.
Figure 15B:
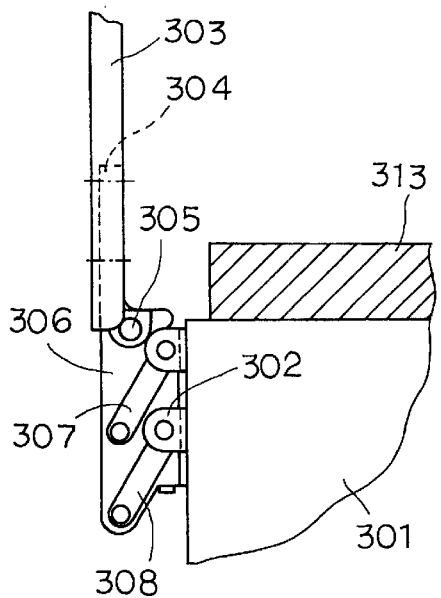
Figure 15C:
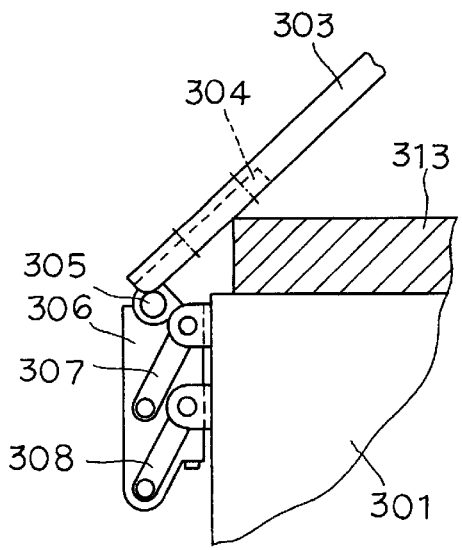
Figure 15D:
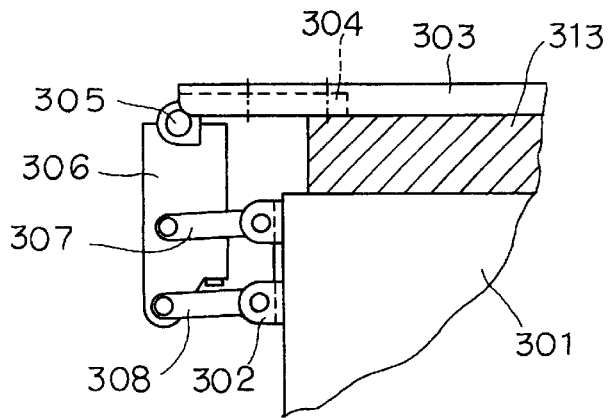
Figure 16A:
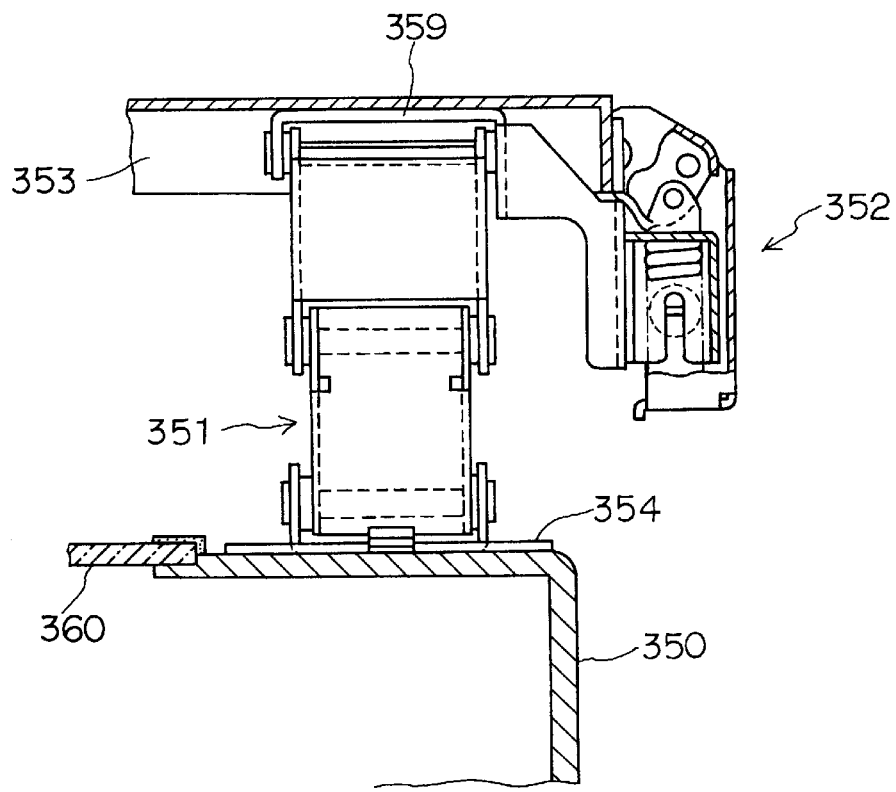
FIGS. 16A and 16B show the second prior art hinge apparatus.
Figure 16B:
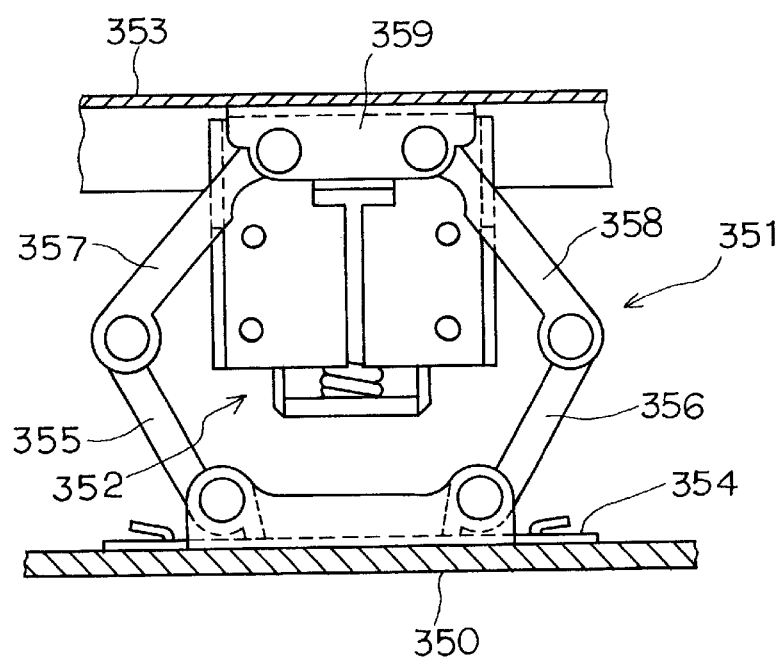

FIG. 14 is a sectional view looking from the direction of the stopper 211 on the hinge apparatus 201 when the position has been adjusted using the stopper 211. The stopper 211 has a flat surface contacting the surface of the side wall 207a of the base 207 and on that flat surface is a hole 211c extending up and down. The screw 232 passes through the screw hole 211c to fasten the side wall 207a on the base 207 and the stopper 211. The stopper 211 can move freely up or down along the side wall 207a when the screws 222 is loosened. However, the upper part flat 211b on the stopper 211 restricts the up and down movement of the screw 221. Also, there is a member expanding to the outside on the stopper 211. Looking at FIG. 10, the arm 204 expands beyond a part of the stopper 211. The receiver part 211a which extends on the stopper 211 and the abutting part 204b which extends on the arm 204 are established so that they make contact. Therefore, the arm 204 cannot rotate to the right any further because of the contact of the receiver member 211a and the abutment member 204b. FIG. 10 shows the movement in the upward direction of the stopper 211 restricted by the contact of the tip of the screw 211 by the flat member 211b on the stopper 211 and the state in which the receiver part 211a contacts the abutment part 204b and the arm 204 cannot rotate any further to the right. Also as shown in FIGS. 14(A) through (C), tightening or loosening the screw 221 raises or lowers the screw in the up or down directions and along with the movement of the stopper 211 in the upward or downward directions, the arm 204 rotates to the left or to the right making it possible to adjust the second base 209 and the angle of the cover B attached therein. This makes it possible to adjust the parallelism of the cover B and the platen C if there is a discrepancy in the attachment of the cover B and the second base 209 or if there is a discrepancy in the angle of the attachment of the platen C and hinge apparatus 201. By tightening the screw 222, the stopper 211 and base 207 can be maintained at the optimum fastening position.

What is claimed is:

1. A hinge apparatus for rotatingly and parallely opening and closing or adjusting a space formed between two bodies comprising:
    a first base means fixed to one of two bodies;
    arm means rotatably linked to said first base means;
    a second base means fixed to the other of said two bodies and;
    at least two link arms each rotatably linked to said arm and to said second base means enabling said second base means to rise or lower providing substantially parallel movement of the one body in relation to the other or to the arm means.

2. A hinge apparatus of claim 1, wherein said link arms form a parallelogram with said arm and said second base means.

3. The hinge apparatus of claim 1, further comprising a restricting means for restricting the rotating movement of at least one of said link arms.

4. A hinge apparatus of claim 3, further comprising a locking means connected between the first base means and the arm means to lock the rotating movement of said arm means when said other body is raised.

5. A hinge apparatus of claim 1, further comprising an urging means for opposing force to resist the rotational moments of one of said link arms.

6. A hinge apparatus of claim 5, wherein said urging means is a compressed spring attached to said body and attached to at least one end of said link arms.

7. A hinge apparatus for rotatingly and parallelly opening and closing or adjusting a space formed between two bodies, comprising:
    a first base means fixed to one of two bodies;
    arm means rotatably linked to said first base means;
    a second base means fixed to the other of said two bodies;
    at least two link arms each rotatably linked to said arm and to said second base means enabling substantially parallel movement of one body in relation to the other, or to the arm means;
    a restricting means for restricting the rotating movement of at least one of said link arms; and
    a locking means connected to the first base means and to the arm means to lock the rotating movement of one of said link arms when said body is opened.

8. The apparatus of claim 7, wherein the two bodies comprise respectively an image-forming device and a platen cover.

9. The apparatus of claim 8, wherein the platen cover includes an original document transporting means for supplying original to the platen one sheet at a time.

* * * * *